United States Patent [19]

Bleicher

[11] Patent Number: 5,083,625
[45] Date of Patent: Jan. 28, 1992

[54] POWDERED MANEUVERABLE HOSPITAL CART

[76] Inventor: Joel N. Bleicher, Rte. 3, P.O. Box 70, Council Bluffs, Iowa 51503

[21] Appl. No.: 546,946

[22] Filed: Jul. 2, 1990

[51] Int. Cl.$^5$ .................................................. B60K 1/00
[52] U.S. Cl. ........................................... 180/65.1; 5/68; 180/6.28; 180/65.5; 180/202; 180/264; 280/43.17
[58] Field of Search ...................... 5/60, 68; 180/65.1, 180/65.5, 264, 200, 202, 199, 6.28; 280/43.17, 43.22

[56] References Cited

U.S. PATENT DOCUMENTS

| | | | |
|---|---|---|---|
| 813,213 | 2/1906 | Johnson | 180/264 |
| 1,598,124 | 8/1926 | Evans | 180/342 |
| 2,635,899 | 4/1953 | Osbon, Jr. | 280/211 |
| 2,999,555 | 9/1961 | Stroud et al. | 180/19 R |
| 3,112,001 | 11/1963 | Wise | 180/6.5 |
| 3,380,546 | 4/1968 | Rabjohn | 180/65.5 |
| 3,413,663 | 12/1968 | Swann | 5/81 R |
| 3,452,371 | 7/1969 | Hirsch | 5/81 B |
| 3,724,003 | 4/1973 | Ellwanger et al. | 5/68 |
| 3,814,199 | 6/1974 | Jones | 180/907 |
| 3,876,024 | 4/1975 | Shieman et al. | 180/19 R |
| 4,137,984 | 2/1979 | Jennings et al. | 180/98 |
| 4,415,049 | 11/1983 | Wereb | 180/907 |
| 4,475,611 | 10/1984 | Fisher | 180/65.1 |
| 4,489,449 | 12/1984 | Failor et al. | 5/68 |
| 4,687,215 | 8/1987 | Brendgord et al. | 280/79.11 |
| 4,718,133 | 1/1988 | DiMatteo et al. | 5/81 R |
| 4,811,988 | 3/1989 | Immel | 298/2 |

FOREIGN PATENT DOCUMENTS

| | | | |
|---|---|---|---|
| 63575 | 4/1983 | Japan | 180/907 |
| 38176 | 3/1984 | Japan | 180/199 |

Primary Examiner—Andres Kashnikow
Assistant Examiner—Eric Culbreth
Attorney, Agent, or Firm—Sean Patrick Suiter

[57] ABSTRACT

A powdered maneuverable cart with a cart frame including a top load bearing portion and a bottom portion interconnected having hydraulic cylinders for raising the top portion in relation to the bottom portion. Situated above the cart frame top portion is a generally horizontal load bearing portion having head and feet ends with means included for allowing the head and feet ends to be raised and lowered independently in relation to the cart frame top portion. The cart frame bottom portion includes four swivel wheels mounted at each of the four corners of the bottom portion for allowing rolling and turning movements of the cart. Situated between the four swivel wheels, and generally in the central area of the cart frame bottom portion, is a drive wheel carriage having two opposing drive wheels. The rotational rate and direction of each drive wheel may be controlled independently for steering the cart. In order that the cart may be moved about manually, and in short side to side movements, the drive wheel carriage includes means for raising and lowering the carriage so as to engage or disengage the drive wheels from the floor surface. The drive wheel carriage may be interconnected to the underside of the cart bottom portion by a turntable allowing the carriage to be rotated about is vertical center on the turntable.

7 Claims, 5 Drawing Sheets

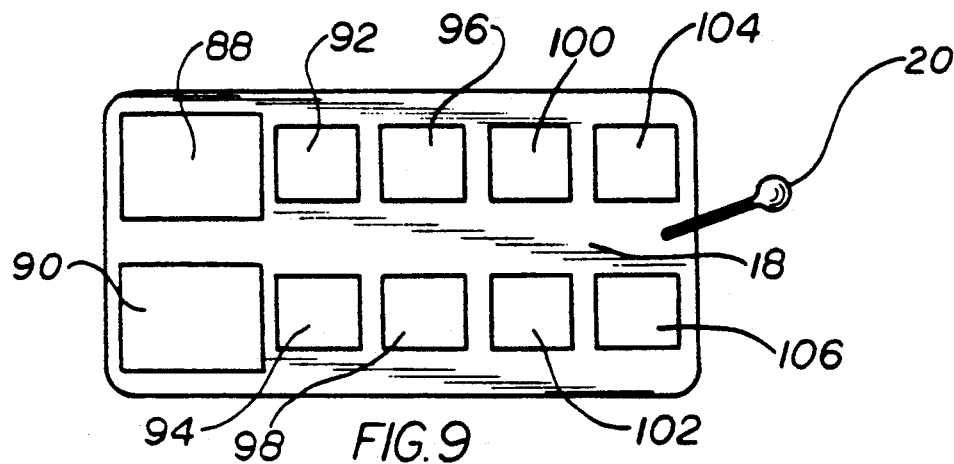
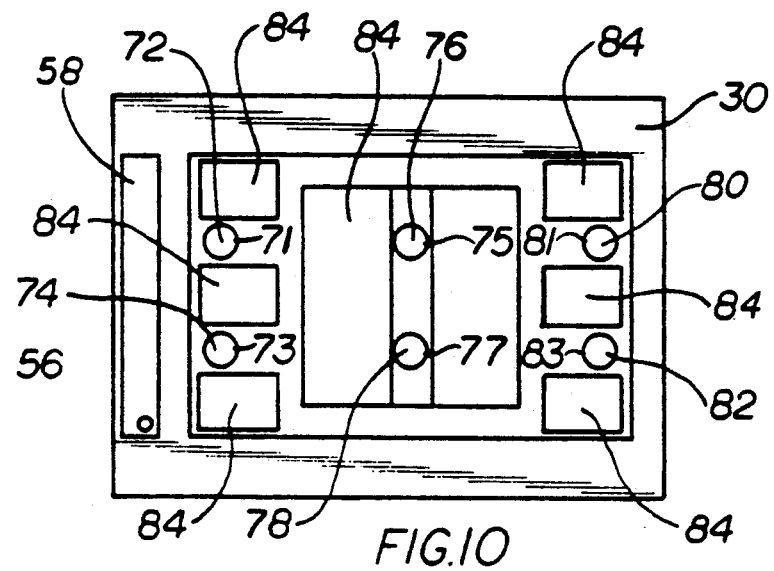
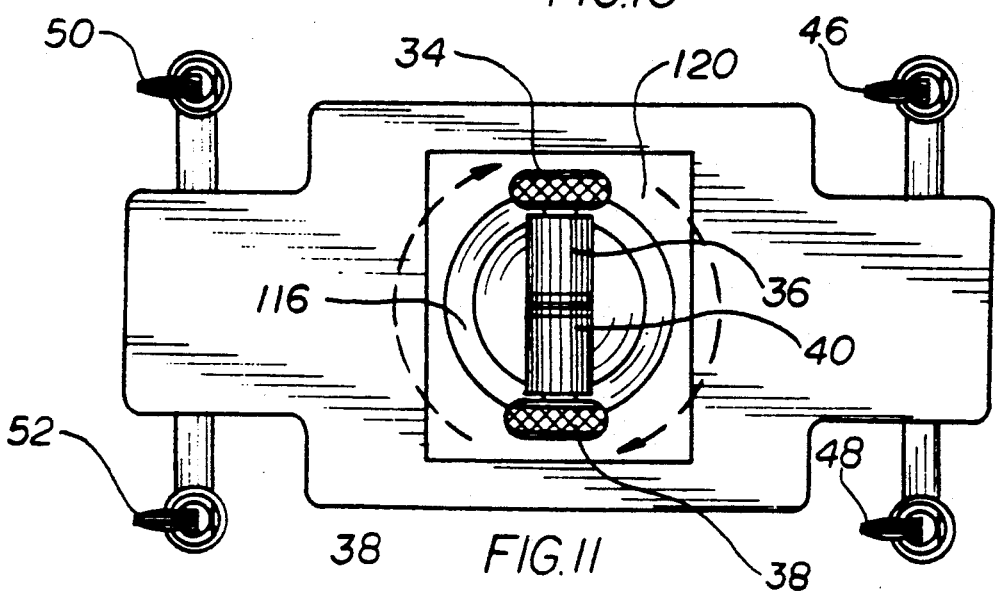

POWDERED MANEUVERABLE HOSPITAL CART

BACKGROUND OF THE INVENTION

The present invention is directed to wheeled carts and more particularly to adjustable powered maneuverable carts.

Load bearing carts are in wide use in a variety of industries. For example, carts or wheelbarrows are used in the construction and mining industries, hand trucks or light duty forklifts are used in the manufacturing and shipping industries, and carts or gurneys are used in health care industries.

Workmen are often required to transport heavy loads in and around construction sites. Needed materials are unloaded from trucks or the like, and either carried by a group of workers, or by wheelbarrow, to material piles on the construction site. These materials are usually heavy and cumbersome. Additionally, the areas in and around the site are usually difficult to maneuver through for a variety of reasons.

While wheelbarrows are successfully adapted for transporting brick, block, and concrete—oddly shaped materials such as rebar, sheet rock, particle or plywood boards, and other lumber are difficult to transport on existing wheelbarrows and construction carts. Materials of this type must be carried by hand through tight spaces increasing construction time and costs.

Forklifts are well known in the manufacturing and shipping industries and are widely used in warehouses, shipping terminals, and along production lines for transporting goods and materials.

Forklift designs vary widely with each design adapted for a particular type of task. While some forklifts are capable of maneuvering in tight quarters, they are difficult to operate, expensive, often require that materials be transported by pallets, and are not capable of rotating about their vertical center.

Hospital patients and the like are often moved from one location to another on carts known as gurneys. On any given hospitalization a patient may be moved several times. A patient may be admitted on a stretcher and transferred to an examination table. From the examination table a patient may be transferred by a gurney for X-rays, an MRI, or the like. This same patient may then be transferred by gurney to his or her room. If surgery is deemed necessary the patient will be transferred by gurney to an operating room, and then after surgery, by gurney, to a recovery room. This same patient will likely be moved from the recovery room back to his or her room by gurney.

Thus, it may be seen that patients are moved extensively to various specialized areas located within any given hospital. Gurney designs, and the architectural design of most hospitals make it difficult to maneuver gurneys about hospitals.

Gurneys must have a fairly long and narrow wheel base to accommodate the narrow corridors and elevators found in many hospitals. Corners and narrow doorways also add to the labor intensive nature and inherent difficulty found in moving patients, often in life threatening situations, through hospitals.

Additionally, the height of many examination tables, examination device tables, hospital beds, and the like, make it difficult to transfer patients onto and off of gurneys from such tables or beds.

Accordingly, a principal object of the present invention is to provide an improved maneuverable cart.

Another object of the present invention is to provide a powered maneuverable cart that may easily traverse tight and difficult areas.

Another object of the present invention is to provide a powered maneuverable cart that requires little or no effort to operate.

Another object of the present invention is to provide a powered maneuverable cart that is silent in operation.

Another object of the present invention is to provide a powered maneuverable cart that is rugged and durable in construction.

Another object of the present invention is to provide a powered maneuverable cart that will allow a transportable's position on the apparatus top to be manipulated from a flat position to any of an infinite number of varying combinations of elevated front or rear positions.

Another object of the present invention is to provide a powered maneuverable cart that has height adjustment controls for facilitating the positioning of a transportable on or off of the apparatus.

Another object of the present invention is to provide a powered maneuverable cart that is highly maneuverable.

Another object of the present invention is to provide a powered maneuverable cart that may be driven sideways.

Finally, another object of the present invention is to provide a powered maneuverable cart that may be power rotated about its vertical center.

SUMMARY OF THE INVENTION

The present invention includes a cart frame having a top portion and a bottom portion. Four swivel wheels are mounted at each of the four corners of the bottom portion for allowing rolling and turning movements of the cart. Situated between the four swivel wheels, and generally in the central area of the cart frame bottom portion, is a drive wheel carriage having two opposing drive wheels. The rotational rate and direction of each drive wheel may be controlled independently for steering the cart.

So that the cart may be moved about manually, and in short side to side movements, the drive wheel carriage includes means for raising and lowering the carriage so as to engage or disengage the drive wheels from the floor surface.

So that the cart may be power driven along its transverse axis a turntable allowing the drive wheel carriage to be rotated about its vertical center may also be provided.

The cart frame top portion and the bottom portion may be interconnected by means for raising the top portion in relation to the bottom portion. A load bearing platform or portion having head and feet ends with means included for allowing the head and feet ends to be raised and lowered independently in relation to the cart frame top portion may also be provided.

The cart may also include a bifurcated table top hinged transversely so as to allow the feet and head areas of the top to be raised and lowered independently.

BRIEF DESCRIPTION OF THE DRAWINGS

FIG. 9 is a diagrammatic illustration of a control panel for a preferred embodiment of the powered maneuverable cart;

FIG. 10 is a top plan view of a preferred hospital gurney embodiment of the powered maneuverable cart showing the stretcher portion removed so as to expose the frame top portion and certain hydraulic components;

FIG. 11 is a bottom plan view of a preferred hospital gurney embodiment of the powered maneuverable cart showing the drive wheel carriage mounted to a turntable;

DESCRIPTION OF THE PREFERRED EMBODIMENT

Figure 1:
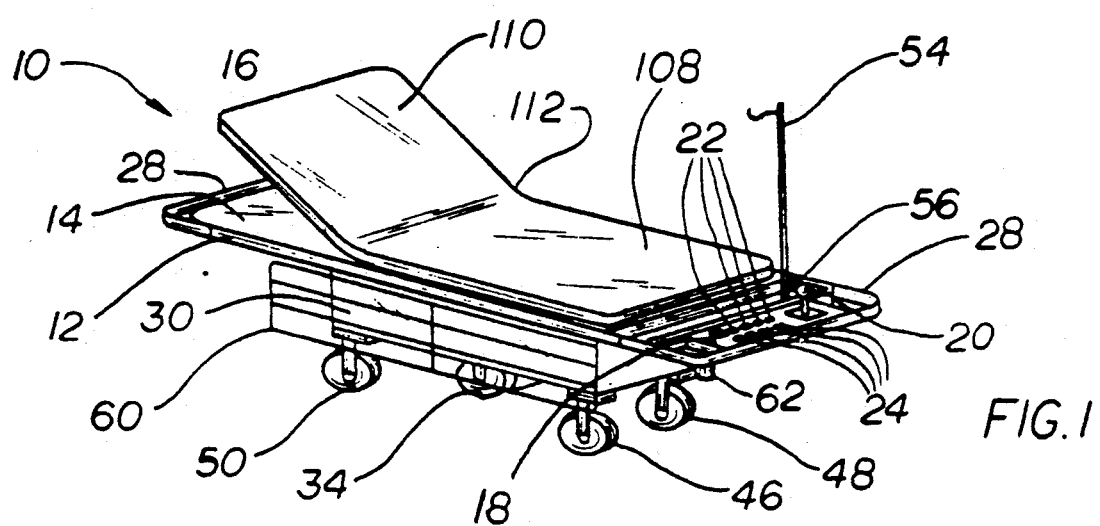
FIG. 1 is a perspective view of a preferred hospital gurney embodiment of the powered maneuverable cart.

A preferred embodiment of the present invention is illustrated in FIGS. 1 through 13. The invention is illustrated for use as a hospital gurney 10.

The powered maneuverable hospital cart or gurney 10 includes a generally horizontal frame top portion 12 and a frame bottom portion 30.

The frame top portion 12 has top and bottom surfaces, front and rear edges, and left and right edges. The frame top portion 12 has a pair of hand holds 28 along both the front and rear edges to facilitate control of the cart in both forward and reverse directions. Also included are a plurality of bumpers 26 mounted along the front and rear edges, and the left and right edges of the frame top portion 12 to prevent damage to the cart 10, or hospital walls or equipment.

The frame top portion 12 also includes a recessed compartment storage drawer 114, located generally toward the front of the frame top portion 12, for storing medical equipment and the like. An IV pole 54 may be inserted into an IV support socket cavity 56 located on the top surface of the top portion of the frame top portion (FIG. 1). When not in use the IV pole 54 may be removed from the socket 56 and stored in the storage drawer 58 (FIG. 10).

The frame bottom portion 30 has both top and bottom surfaces, front and rear edges, left and right side edges, and an interior battery compartment 42.

Figure 7:
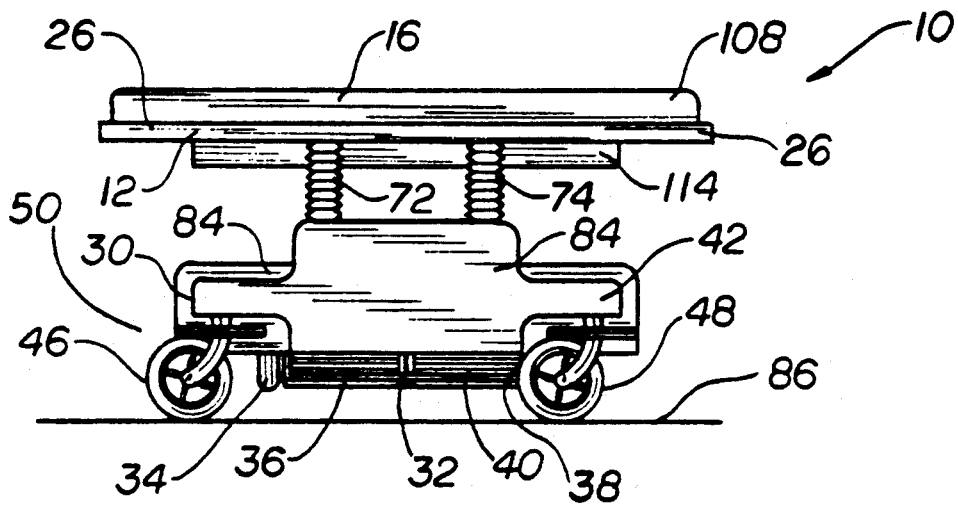
FIG. 7 is a front or head end view of a preferred hospital gurney embodiment of the powered maneuverable cart showing the drive wheel carriage in a retracted position so as to allow the cart to be maneuvered manually in side-to-side movements.
Figure 8:
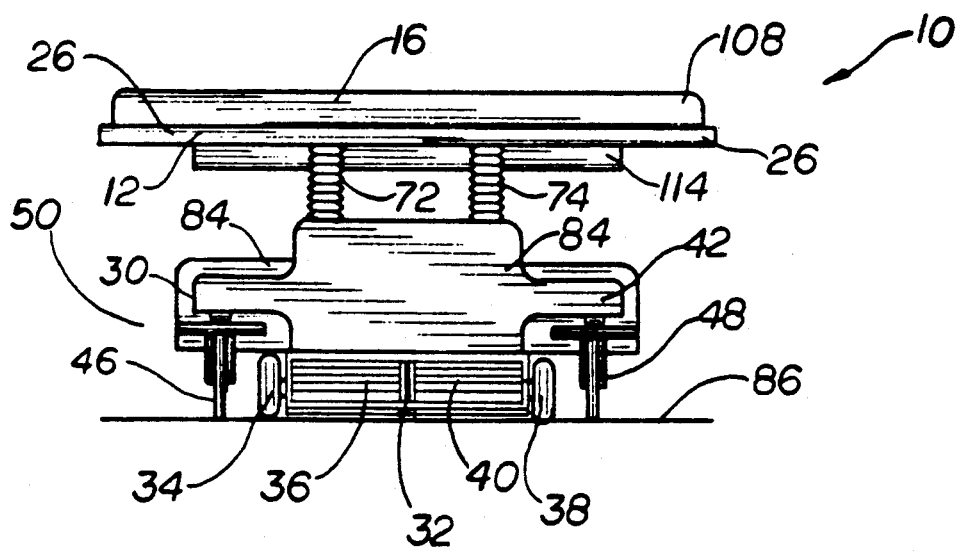
FIG. 8 is a front or head end view of a preferred hospital gurney embodiment of the powered maneuverable cart showing the drive wheel carriage in a lowered engaged position so as to allow the cart to be power driven.

Mounted at each of the four corners of the underside of the frame bottom portion 30 are four swivel wheels, a left front swivel wheel 46, a right front swivel wheel 48, a left rear swivel wheel 50, and a right rear swivel wheel 52 (FIGS. 7, 8, and 11). Each wheel, 46, 48, 50 and 52 may swivel independently 360° about a generally upright axis so that the frame bottom portion 30 may be steered.

Figure 12:
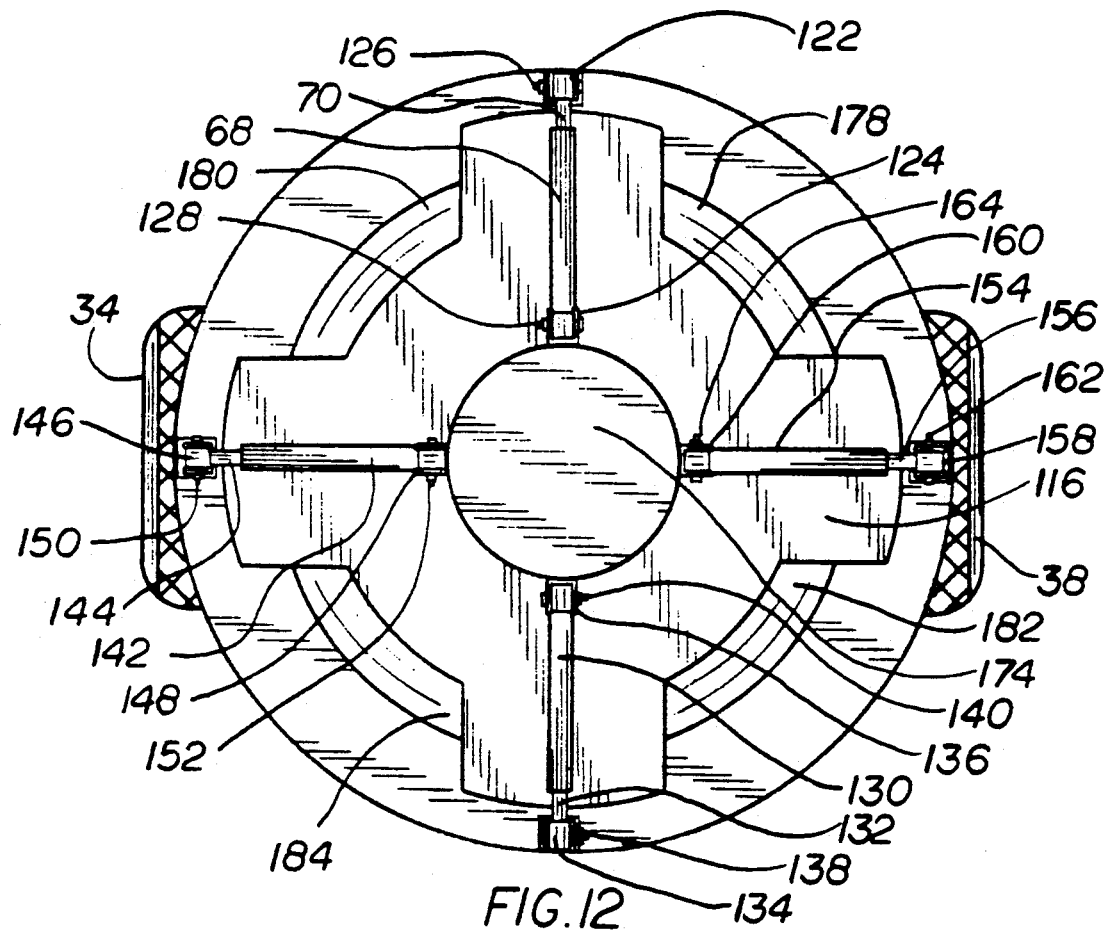
FIG. 12 is a top plan view of the drive wheel carriage assembly of a preferred embodiment of the powered maneuverable cart showing the drive wheel turntable suspension system and the drive wheel carriage attached to a turntable.
Figure 13:
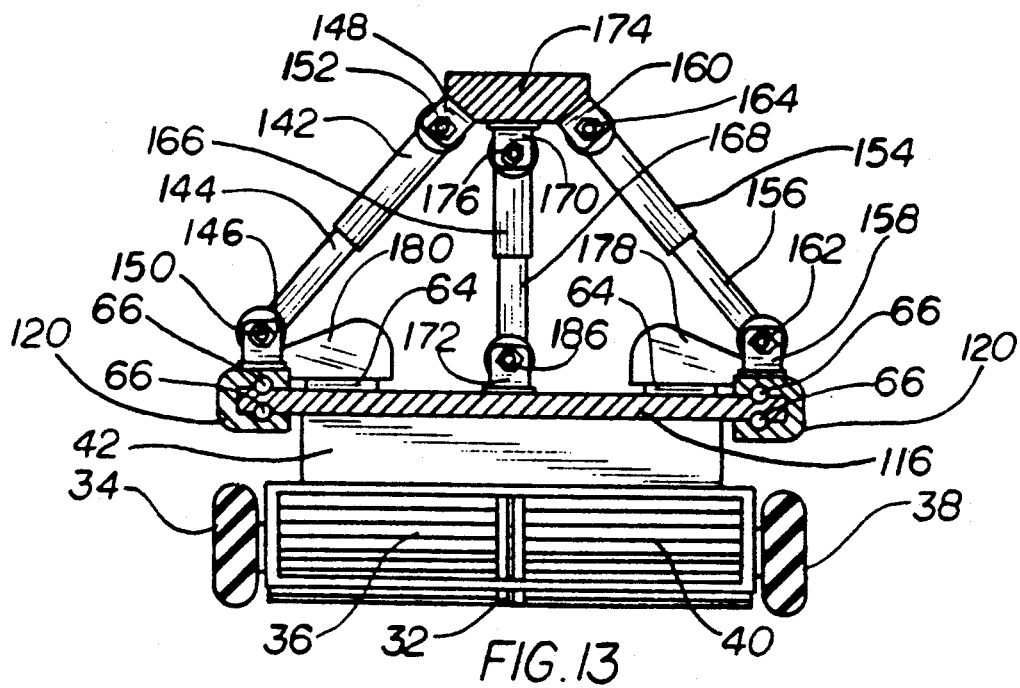
FIG. 13 is a side elevational view of the drive wheel carriage assembly of a preferred embodiment of the powered maneuverable cart showing the drive wheel carriage, battery compartment, turntable and braking assembly, suspension system, and hydraulic wheel disengagement cylinder for raising and lowering the drive wheel carriage into or out of engagement with a drive surface.

Mounted to the central portion of the underside of the frame bottom portion 30 is a drive wheel carriage (FIGS. 7, 8, 11, 12, and 13). The drive wheel carriage includes a frame 32 for securing left and right direct current drive motors (36 and 40 respectively, FIGS. 7, 8, 11, 12, and 13). Each of the drive motors 36 and 40 are independently connected to a set of rechargeable batteries (such as Fortress Scientific Group 22F Deep Cycle 12 Volt Batteries, or the Varta Group 24 Deep Cycle 12 Volt Batteries) mounted in the battery compartment 42. The batteries may be recharged through recharge outlet 44. Mounted on the drive shaft of the drive motors 36 and 40 are drive wheels 34 and 3(FIG. 12 and 13).

So that the drive wheel carriage may be rotated about the vertical center of the frame the drive wheel carriage is mounted to a turntable 116. The turntable may rotate between a plurality of bearings 66 mounted in the turntable support ring 120. Mounted on the top surface of the ring 120 are four shock absorbers 68, 130, 142, and 154 (FIG. 12). The ram 70 of the front suspension cylinder 68 is mounted to the front bottom bracket 122 on the front of the ring 120 by a pin 126. The ram 132 of the rear suspension cylinder 130 is mounted to the rear bottom bracket 134 on the rear of the ring 120 by a pin 138. The ram 144 of the left suspension cylinder 142 is mounted to the left bottom bracket 146 on the left of the ring 120 by a pin 150. The ram 156 of the right suspension cylinder 154 is mounted to the right bottom bracket 158 on the right of the ring 120 by a pin 162.

The four cylinders 68, 130, 142, 154 are gathered and connected to the drive wheel carriage top plate 174 (FIG. 12). The front suspension cylinder 68 is mounted to the front top bracket 124 on the front of the top plate 174 by a pin 128. The rear suspension cylinder 130 is mounted to the rear top bracket 136 on the rear of the top plate 174 by a pin 140. The left suspension cylinder 142 is mounted to the left top bracket 148 on the left of the top plate 174 by a pin 152. The right suspension cylinder 154 is mounted to the right top bracket 160 on the right of the top plate 174 by a pin 164.

Mounted to the center of the bottom surface of the top plate 174 is a hydraulic carriage engagement cylinder top bracket 170. The carriage engagement cylinder 166 is fastened to the top bracket 170 by a pin 176 (FIG. 13). Rotatably mounted to the center top surface of the turntable 116 is a carriage engagement ram bottom bracket 172. The ram 168 Of the cylinder 166 is secured to the bottom bracket 172 by pin 186.

The drive wheel carriage assembly may be disengaged from the drive surface 86 by withdrawing hydraulic fluid from the carriage engagement cylinder 166. The ram 168 retracts into the cylinder 166 causing the four suspension cylinder rams 70, 132, 144, and 156 to retract.

By allowing the flow of hydraulic fluid back into the carriage engagement cylinder 166, and the hydraulic fluid pressure to equalize with the pressure in the four suspension cylinders 68, 130, 142, 154 the drive wheels 34 and 38 will engage the drive surface 86. Suspension cylinders and hydraulic components are well known to the art, and such components may be stored within compartment 42 (FIG. 13).

The turntable 116 may be rotated in clockwise or counter-clockwise directions by depressing switches 88 and 90 respectively. By rotating the turntable 116 the drive Wheel carriage wheels 34 and 38 may be pointed in a transverse direction (FIG. 12). The drive wheel carriage assembly may then be locked by the brake pads 264 of the front right brake 178, front left brake 180, right rear brake 182, and left rear brake 184. Thus, allowing the cart 10 to be powered driven in side-to-side directions.

Figure 2:
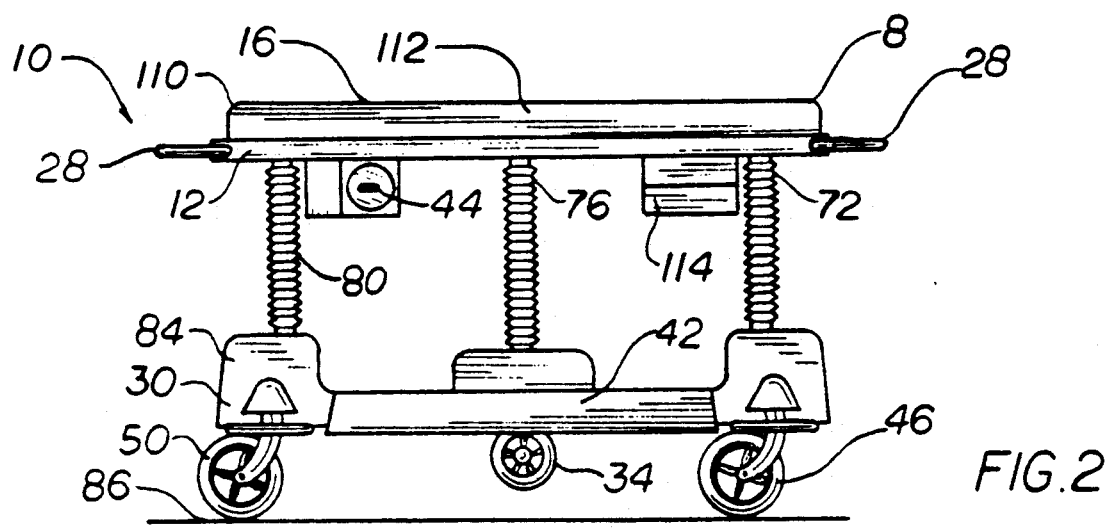
FIG. 2 is a side view of a preferred hospital gurney embodiment of the powered maneuverable cart showing the drive wheel carriage in a retracted non-engaged position and the top portion in a raised position.
Figure 3:
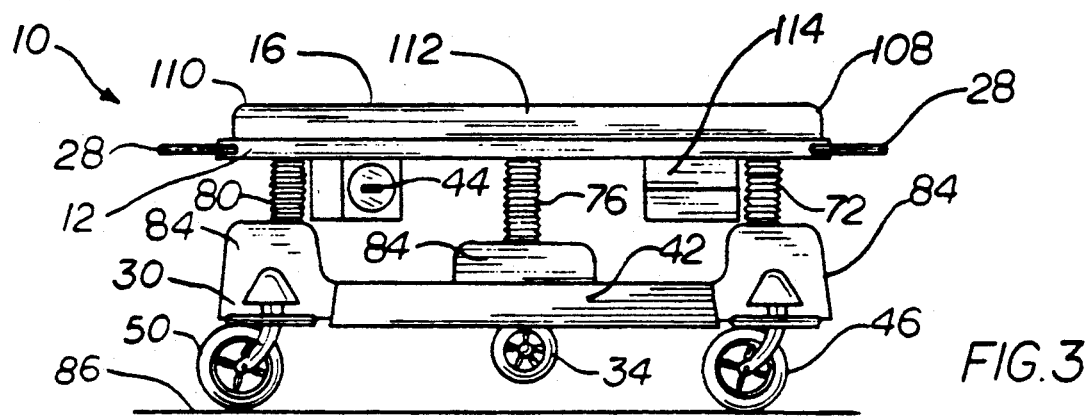
FIG. 3 is a side view of a preferred hospital gurney embodiment of the powered maneuverable cart showing the drive wheel carriage in a retracted non-engaged position and the top portion in a lowered position.

The top surface of the top plate 174 may be mounted to the cart frame bottom portion 30 by a weld, bolts, or the like. Located toward the front edge of the frame top portion 12 is a control panel 18 having a plurality of control switches, 88, 90, 92, 94, 96, 98, 100, 102, 104, and 106 which control the turntable 116 as well as the drive wheels 36, 40 and the various cylinders 72, 74, 76, 78, etc. and a joystick 20 (FIGS. 1 and 9). Mounted toward the rear edge on the underside of the frame top portion is an electric recharge outlet 44 (FIG. 2).

Included in the electrical circuitry between the batteries and motors is a dual axis joystick 20 (FIG. 1). The joystick 20 may be used to independently control the direction and rotational rate of each of the drive wheels 34 and 38.

By utilizing the joystick 20 an operator may steer the cart 10. By pressing straight and forward on the joystick 20 the cart will follow a straight line forward since both drive motors 36 and 40 will turn counter clockwise at the same rate. Likewise, by pulling straight and back on the joystick 20 the cart may be made to go in reverse along a straight path since both drive motors 36 and 40 will turn clockwise at the same rate. It should also be obvious that by pressing the joystick 20 forward and to the left the cart will turn left at a rate proportional to the extent the joystick is moved forward and left, and that by pressing the joystick 20 forward and to the right the cart will turn right at a rate proportional to the extent the joystick is moved forward and right.

So that the height of the cart frame top portion 12 may be raised or lowered in relation to the cart frame bottom portion 30, three pairs of telescoping hydraulic cylinders are provided. These cylinders include an interior ram that may be moved independently of the exterior ram.

The cart frame top portion 12 has a pair of forward holes, a pair of center holes, and a pair of rear holes. The exterior rams of forward cylinders 72, and 74 have a diameter greater than the diameter of the top portion forward holes 71 and 73, but larger than the diameter of the interior ram of cylinders 70 and 72 (FIG. 10). The exterior rams of central cylinders 76 and 78 have a diameter greater than the diameter of the top portion central holes 75 and 77, but larger than the diameter of the interior ram of cylinders 76 and 78 (FIG. 11). The exterior rams of rear cylinders 80 and 82 have a diameter greater than the diameter of the top portion rear holes 81 and 83, but larger than the diameter of the interior ram of cylinders 80 and 82 (FIG. 11).

A stretcher portion 14 has a transverse hinge 112, a head end 108, a foot end 110, and a mattress covering 16 situated above the top surface of the cart frame top portion 12. The underside of the stretcher portion has three pairs of mounting brackets. The top of the interior rams of forward cylinders 72 and 74 are connected to the head end 108 stretcher portion brackets. The top of the interior rams of central cylinders 76 and 78 are connected to brackets mounted to the underside of the stretcher portion hinge 122. The top of the interior rams of rear cylinders 80 and 82 are connected to brackets mounted to the underside of the foot end 110 of the stretcher portion 14.

The components necessary to drive the cylinders are well known in the art, and such components may be stored within the hydraulic component storage areas marked with the numeral 84.

Figure 4:
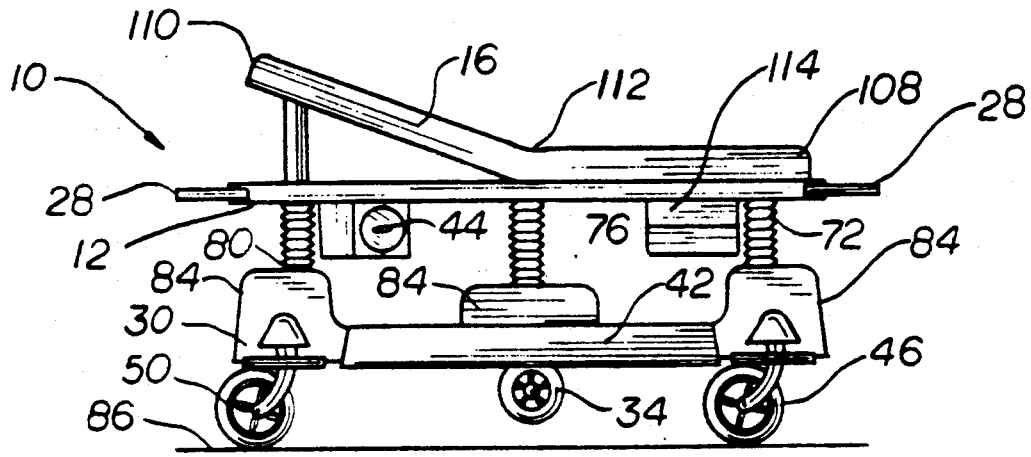
FIG. 4 is a side view of a preferred hospital gurney embodiment of the powered maneuverable cart showing the rear or feet end of the stretcher portion in a raised position.
Figure 5:
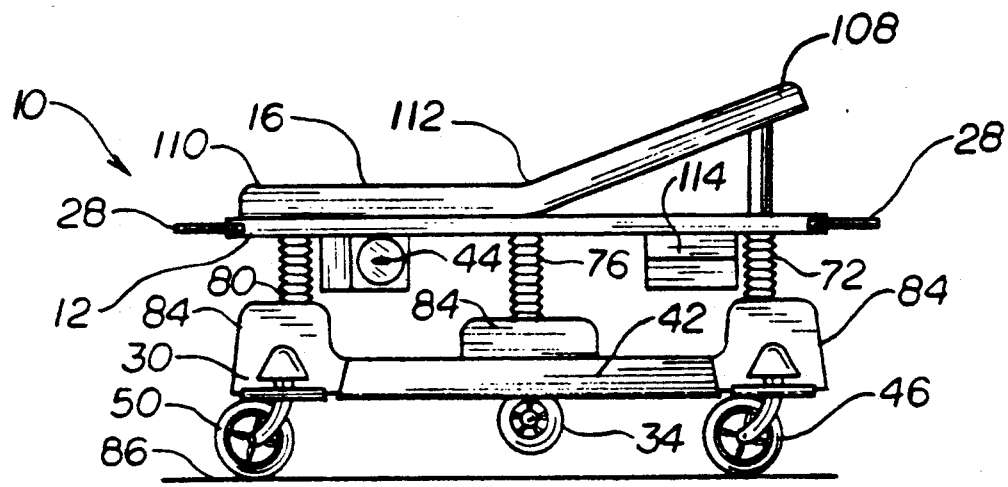
FIG. 5 is a side view of a preferred hospital gurney embodiment of the powered maneuverable cart showing the front or head end of the stretcher portion in a raised position.
Figure 6:
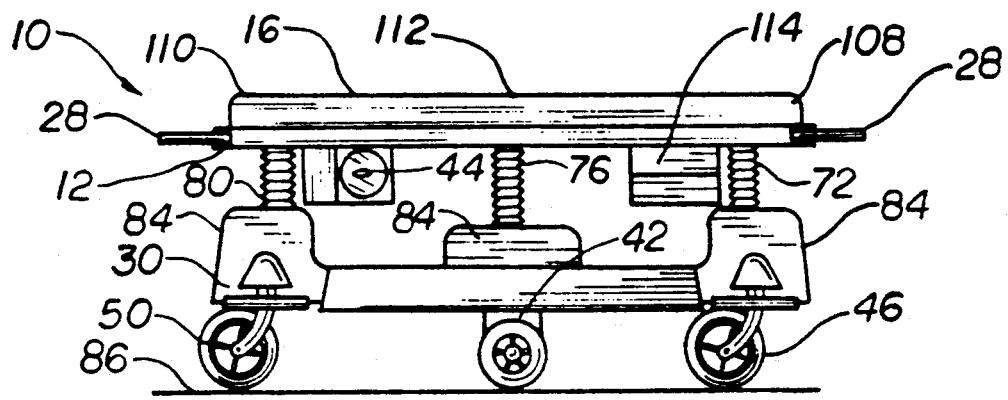
FIG. 6 is a side view of a preferred hospital gurney embodiment of the powered maneuverable cart showing the drive wheel carriage in a lowered engaged position.

In order to raise and lower the head end 108 or foot end 110 of the stretcher portion 14 independently, an operator may utilize switches 92, 94, 96, and 98. By depressing switch 92 the interior ram of the left and right front cylinders 72 and 74 extend to raise the head end 108 of the stretcher portion 14 and 16 to the height desired by the operator or patient (FIG. 5 and 9). By depressing switch 94 the head end 108 may be lowered (FIGS. 6 and 9). By depressing switch 96 the interior ram of the left and right rear cylinders 80 and 82 extend to raise the foot end 110 of the stretcher portion 14 and to the height desired by the operator or patient (FIGS. 4 and 9). By depressing switch 94 the foot end may be lowered (FIGS. 6 and 9).

It should also be apparent, although not shown by the Figures, that the turntable 116 might be rotated by a drive motor having a gear registerable with turntable teeth.

As previously described the turntable 116 may also be rotated by reversing either of the wheels 34 or 36 while simultaneously causing the other wheel to rotate in a forward direction. The turntable 116 may then be locked with the a brake system as described before. The joystick 20 may then be used to power drive the cart 20 is side-to-side directions.

The cart frame top 12 and bottom 30 portions, and stretcher portion 14 may be fabricated from any rigid material. Aluminum or stainless steel is preferred. The mattress 16 may have a synthetic foam core covered by a rip and stain resistant easy to clean fabric. The swivel wheels 46, 48, 50, and 52 tires and bumpers 26 should be fabricated from a durable non-marking synthetic rubber.

Although the dimensions of the cart are not critical, a preferred embodiment of the invention should be at least 220 centimeters long and at least 80 centimeters wide. Likewise the mattress should be capable of being lowered to an unloaded height of at least 70 centimeters, and capable of being raised to a height of at least 120 centimeters.

Whereas, the invention has been disclosed in connection with a preferred embodiment thereof, it is apparent that many modifications, substitutions and additions may be made thereto which are within the intended broad scope of the appended claims. For example, the invention may be adapted for use as a wheelbarrow, forklift, or any other load carrying device.

Thus, there has been shown and described a powered maneuverable hospital cart or gurney which accomplishes at least all of the stated objects.

I claim:

1. A powered maneuverable cart comprising:

a cart frame having a top portion and a bottom portion;

a plurality of cylinders all operatively associated with said bottom portion of the cart frame; wherein, at least some of said plurality of cylinders are also operatively associated with said top portion of the cart frame; others of said plurality of cylinders extend through said top portion of the cart frame; and yet still at least one other of said plurality of cylinders project downwardly from said bottom portion of the cart frame;

a stretcher portion operatively disposed above the said top portion of the cart frame; and, having a front end and a rear end operatively connected together by a transverse hinge; wherein, said others of said plurality of cylinders which extend through said top portion of the cart fame are operatively connected to said stretcher portion for raising and lowering the front end and rear end of the stretcher portion independently of one another;

at least three swivel wheel mounted in a spaced relation on said bottom of the cart frame;

a drive wheel carriage operatively connected to said bottom portion of the cart frame via said at least one other of said plurality of cylinders which project downwardly from said bottom portion; wherein, the drive wheel carriage is provided with at least one drive wheel; and, diverse means for controlling the operation of said plurality of cylinders and said at least one drive wheel.

2. The powered maneuverable cart of claim 1 further comprising means for raising and lowering said drive wheel carriage so as to bring said at lest one drive wheel selectively into and out of engagement with a floor surface.

3. The powered maneuverable cart of claim 2, further comprising a turntable rotatably connected to said bottom portion and connected to said drive wheel carriage whereby said drive wheel carriage may be rotated 360° relative to the cart frame.

4. The powered maneuverable cart of claim 1; wherein, said drive carriage is provided with a pair of drive wheels.

5. The powered maneuverable cart of claim 4; wherein, said pair of drive wheels are axially aligned.

6. The powered maneuverable cart of claim 5; further comprising means for independently controlling the rotation rate and direction of each of said drive wheels.

7. A powered maneuverable cart, comprising:

a cart frame having a load bearing portion and a bottom portion;

at least three swivel wheels mounted in spaced relation along said frame bottom portion;

a drive wheel carriage having two reversible drive motors wherein each of said reversible drive motors rotatably drive a drive wheel;

turntable means mounted to said drive wheel carriage such that said drive wheels may rotate said turntable 360° in any direction; and suspension means for mounting said turntable means such that said drive wheels of said drive wheel carriage are maintained in contact with a drive surface an such that said drive wheel carriage may be rotatably driven beneath said cart frame whereby selectively controlling the rotation and speed of said drive motors said cart may be driven in any direction without necessitating rotation or re-orientation of said cart frame.

* * * * *

UNITED STATES PATENT AND TRADEMARK OFFICE
CERTIFICATE OF CORRECTION

PATENT NO.   :   5,083,625
DATED        :   Jan. 28, 1992
INVENTOR(S)  :   Joel N. Bleicher It is certified that error appears in the above-identified patent and that said Letters Patent is hereby corrected as shown below:

In the title of the invention [54] change "POWDERED" to --POWERED--.

In the ABSTRACT, line 1, change "powdered" to --powered--.

In Column 1, line 2, change "POWDERED" to --POWERED--.

Signed and Sealed this

Twenty-seventh Day of April, 1993

Attest:

MICHAEL K. KIRK

Attesting Officer

Acting Commissioner of Patents and Trademarks